F. J. B. CORDEIRO & C. PULFRICH.
ANGLE MEASURING INSTRUMENT.
APPLICATION FILED AUG. 5, 1910.
994,061.
Patented May 30, 1911.
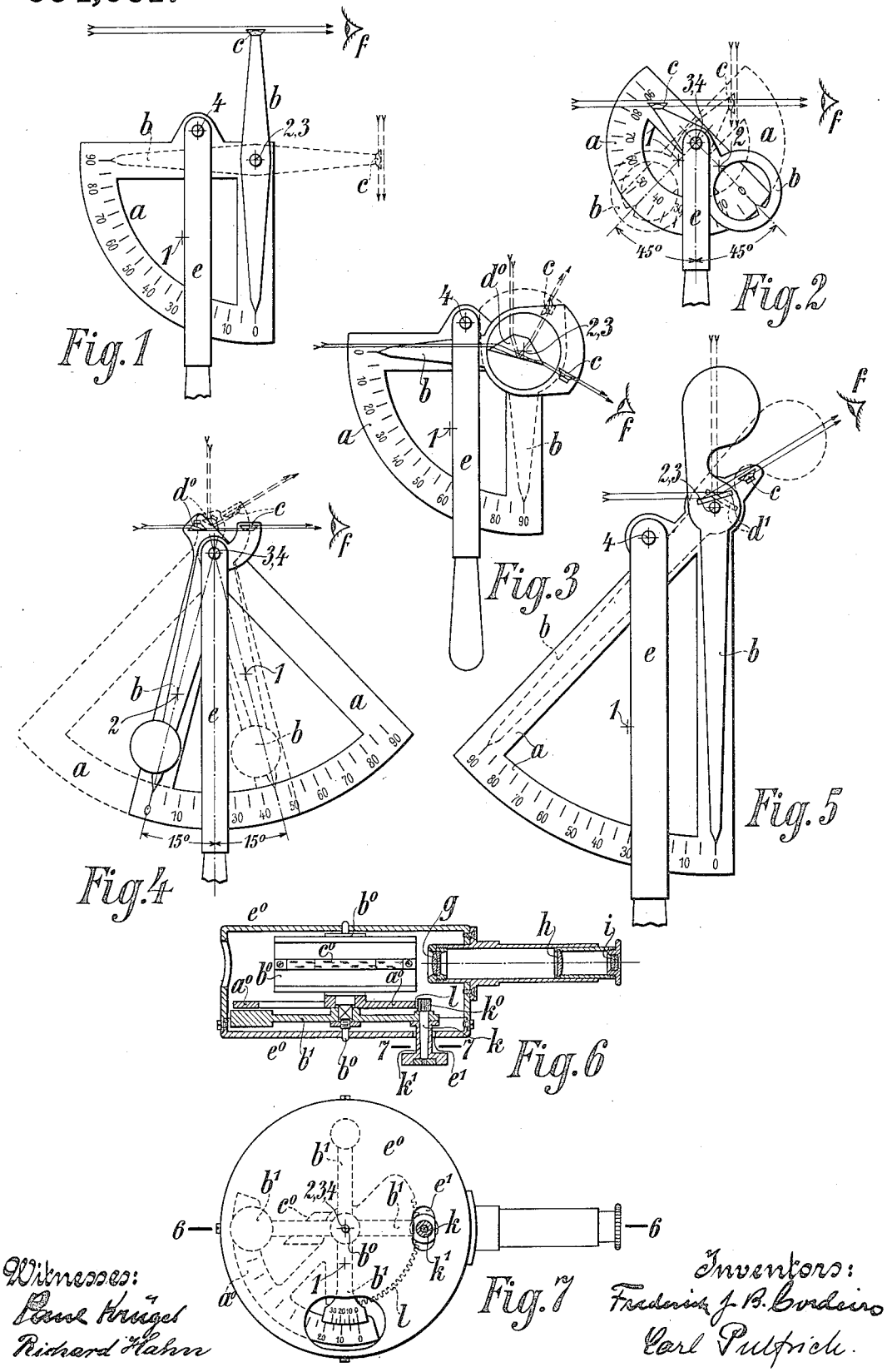
Witnesses:
Paul Krügel
Richard Hahn
Inventors:
Frederick J. B. Cordeiro
Carl Pulfrich

UNITED STATES PATENT OFFICE.

FREDERICK J. B. CORDEIRO, OF BROOKLINE, MASSACHUSETTS, AND CARL PULFRICH, OF JENA, GERMANY, ASSIGNORS TO THE FIRM OF CARL ZEISS, OF JENA, GERMANY.

ANGLE-MEASURING INSTRUMENT.

994,061. Specification of Letters Patent. Patented May 30, 1911.

Application filed August 5, 1910. Serial No. 575,640.

*To all whom it may concern:*

Be it known that we, FREDERICK J. B. CORDEIRO, a citizen of the United States, residing at Brookline, in the State of Massachusetts, and CARL PULFRICH, a citizen of the German Empire, residing at Carl-Zeiss strasse, Jena, in the Grand Duchy of Saxe-Weimar, Germany, have invented a new and useful Angle-Measuring Instrument, of which the following is a specification.

The invention consists in an instrument for measuring vertical angles, which is specially intended for use with the free hand and to the essential parts of which belongs a mirror, which serves the purpose of projecting a reflected image of the object, and is suspended so as to pendulate. Well known instruments of this type are certain sextants, in which the aforesaid mirror forms an artificial horizon. They present to the observer besides the fixed image of the object another one projected by the horizontal mirror, which performs a pendulous movement in a vertical direction. In order to measure the vertical angle the instrument must be so set that the moving image in its middle position coincides with the fixed image.

The instrument according to the present invention is, although giving the same results, substantially simpler than those sextants with an artificial horizon. The mirror, the pendulum that carries it, and a holder, to which the pendulum is suspended, together form a complete instrument. The pendulum consists of two limbs, which are rotatable relatively to each other about an axis, parallel to or coincident with the axis of the pendulum. In the former case the axis of rotation may also lie infinitely far, *i. e.* the two limbs may be made shiftable relatively to each other in a straight line. The mirror belongs to one of the two limbs of the pendulum. It consists of a direct vision reflecting prism, which extends through a portion only of the field of vision. According to the varying relative setting of the two limbs of the pendulum the direction of direct vision of the prism has a varying inclination to the other limb. Rays entering the instrument in this direction reach the eye partly right through the prism (without final change of direction, only reversed in their order through the reflection), partly right past the prism, or reach the telescope which may be connected with the holder. Either one of the two limbs of the pendulum carries the scale of vertical angles and the other one the pointer for it.

In order to give the scale a uniform graduation, the limb to which the reflecting prism belongs may be so arranged, that its center of gravity lies in the axis of rotation. In the cases where the axis of rotation coincides with the axis of the pendulum, a uniform graduation can also be attained, by giving the weights of the limbs the inverse ratio of the distances of the centers of gravity from the axis of rotation.

The manipulation of the new instrument, *e. g.* when measuring the altitude of a star, is as follows: In the first place the two limbs of the pendulum are set relatively to each other, till they indicate that vertical angle which a provisional estimate assigns to the star. Then the instrument is grasped with the one hand by its holder (from which the pendulum is suspended) and is held up, while the eyes are turned to the star, in such a manner that, with an approximately level pendulum axis, the reflecting prism (fitted to the one pendulum limb) projects into the path of the light from the star to the pupil of the observing eye. On the retina of this eye the rays which have entered direct produce a fixed image of the star, and those which have passed through the pendulating prism one that moves to and fro in a vertical line, in which, or the production of which, the fixed image lies. The observer must now grasp, altering as little as possible the position of his head and the holder, the pendulum with his free hand and alter the relative setting of the pendulum limbs in such a way that, after releasing the pendulum, the middle point of the streak described by the moving image has come nearer to the fixed image. Generally speaking this procedure must be repeated several times, until the fixed image lies in the middle of that streak, whereupon the scale reading gives the correct vertical angle of the star. The position of the fixed image in the middle of the streak described by the moving image is an indication, that the direction of direct vision of the prism coincides with the direction toward the star just at that moment when the pendulum swings through the middle position, in which it would come to rest, if the holder had a perfectly fixed position. But the direction of direct vision of the prism is the direction, the inclination of which to the horizon is indicated by the scale.

For the measuring of greater vertical angles a more comfortable attitude for the head can easily be obtained by introducing a mirror, fixed to the holder, for the emergence of the rays. But the same object can also be attained by a construction of the instrument, in which the rays coming from the object, no matter in what height this may be situated, are in the first place taken up by a subsidiary mirror, which presents a greater field of vision than the reflecting prism. This subsidiary mirror must belong to that limb to which the reflecting prism does not belong. It may also be constructed as a prism.

In the annexed drawing: Figure 1 is a diagram of one form of the new instrument. Fig. 2 is a diagram of another form. Fig. 3 is a diagram of a third form. Fig. 4 is a diagram of a fourth form. Fig. 5 is a diagram of a fifth form. Fig. 6 is a horizontal section, on the line 6—6 in Fig. 7 through an instrument constructed according to the diagram shown in Fig. 1, but having the axis of rotation coincident with the axis of the pendulum. Fig. 7 is an elevation of the same instrument, partly in section as indicated by the line 7—7 in Fig. 6.

In each of the constructional forms shown in the first five figures the limb fitted with the scale is marked $a$, the one formed as a pointer is marked $b$. The reflecting prism $c$ belongs in the first four figures to the pointer limb $b$, in the fifth figure to the scale limb $a$.
In Figs. 3 and 4 a subsidiary reflecting prism $d^0$ belongs to the scale limb $a$ and in Fig. 5 a subsidiary mirror $d^1$ belongs to the pointer limb $b$. By $e$ the holder is denoted, to which the two-limbed pendulum is suspended. The center of gravity of $a$ lies at 1, that of $b$ at 2. The axis of rotation common to the limbs is marked 3, the axis of the pendulum is marked 4. In each case the instrument is set for an object on the horizon.
At the same time there is indicated by dotted lines the deviating position of one or both limbs, which occurs when the instrument is set for an object in the zenith. A continuous arrow line represents those rays which reach the eye $f$ through the reflecting prism and another such line those which reach the eye past it (in Figs. 1, 2 and 5 over it, in Figs. 3 and 4 behind it). The dotted arrow lines correspond to the setting for the zenith.

In the arrangement according to Fig. 1, the center of gravity 2 of the pointer $b$ is shown as lying in the axis of rotation 3. The angular measure of the 90°-scale is also 90°.

In the arrangement according to Fig. 2 the axis of rotation 3 and the axis 4 of the pendulum coincide. The center of gravity of neither of the two limbs lies in the axis of rotation, so that their relative position must be secured by a sufficient frictional resistance. The weights of the limbs $a$ and $b$ are to each other in the inverse ratio of the corresponding distances 1—3 and 2—3. The angular measure of the 90°-scale is 180°.

Fig. 3 is the first of the three examples with subsidiary mirrors. In this figure again as in Fig. 1 the center of gravity 2 of the pointer $b$ lies in the axis of rotation 3. The central journal of the scale limb $a$ is enlarged, so as to carry the subsidiary reflecting prism $d^0$. The reflecting surface of this prism is inclined by 15° to the horizon. The direction of inspection deviates in this case when the instrument is set for the horizon by 30° upward and when set for the zenith by 60° downward from the horizontal direction. The angular measure of the 90°-scale is 90°.

In the example Fig. 4 the axis of rotation 3 and the axis 4 of the pendulum again coincide as in Fig. 2, also the distances of the centers of gravity 1 and 2 from the axis of rotation have again the inverse ratio of the weights acting in these points. The difference of the direction of inspection with settings for horizon and zenith amounts to only 30°. The angular measure of the 90°-scale is 60°.

In Fig. 5 as in the Figs. 1 and 3 the center of gravity 2 of the pointer $b$ is laid in the axis of rotation 3. For the reflecting surface of the reflecting prism $c$ (and thus for the direction of inspection) an inclination of 30° to the horizon has been chosen. The angular measure of the 90°-scale is 45°.

In reference to the arrangements according to Figs. 1, 3 and 5 it may be mentioned, that they have this property in common, to have one limb, in all three the scale limb $a$, retain its position in whatever direction the instrument may be set. These three arrangements may be altered in many ways, so that e. g. one of the following three new properties can be realized: the center of gravity 1 coincides with the axis 4 of the pendulum, or it coincides—as does already the center of gravity 2—with the axis of rotation 3, or the axis of the pendulum and the axis of rotation—in which already the center of gravity 2 lies—coincide. The last one of these properties is realized in the constructional example Figs. 6 and 7. The holder has the form of a casing $e^0$. In order to enhance the accuracy of setting there is fitted to this casing a telescope, the essential parts of which are an objective $g$ and an ocular consisting of a field lens $h$ and an eye lens $i$. The pointer limb, the center of gravity 2 of which coincides with the axis of rotation 3 and thus at the same time with the axis 4 of the pendulum, is composed of the pendulum shaft $b^0$, journaled in the casing $e^0$, and a cross $b^1$ fixed on this shaft. The pendulum shaft $b^0$ carries the reflecting prism $c^0$, which covers only a middle portion of the field of vision of the telescope. On the cross $b^1$ the vernier is fixed, and also the driving shaft $k$ of a setting device is journaled. The scale limb $a^0$ is rotatable on the pendulum shaft $b^0$. It is also fitted, in addition to the scale, with a toothed sector $l$, which is geared together with a pinion $k^0$ on the driving shaft $k$. By turning the milled head $k^1$ of this shaft, the relative position of the limb fitted with the vernier and the scale limb is altered. When sighting, with the instrument set as represented, at an object on the horizon, in which case the rays entering alongside the prism $c^0$ may be united to form an image of the object approximately in the center of the image field, the two-limbed pendulum can pendulate in the casing $e^0$, and is only then limited by the milled head $k^1$ striking against the upper or lower edge of the opening $e^1$ in the casing, when the corresponding movement of the object image, projected with the aid of the prism, extends nearly to the upper and lower edge of the image field of the astronomical telescope $g$ $h$ $i$. Should the instrument now be pointed at a higher lying object, then $k^1$ lays itself against the upper edge of $e^1$ and the image of the new object projected with the aid of the prism lies near the upper edge of the image field of the telescope and retains this position during the manipulation of the setting device $k^1$, till the center of gravity 1 of the scale limb $a$ has come so near the vertical plane through the axis 4 of the pendulum, that the contact between $k^1$ and $e^1$ ceases and the two-limbed pendulum commences to pendulate. Similar, only reversed, is the proceeding, when the instrument, set for a higher lying object, is pointed at a lower lying one.

We claim:

1. In an instrument for measuring vertical angles the combination, with a holder, of a pendulum suspended to this holder and composed of two limbs, which are rotatable relatively to each other about an axis at right angles to the plane, in which the pendulum is allowed to swing, a circular scale arranged on one of the limbs concentrically to the said axis of rotation, pointing means for this scale carried by the other limb and a direct vision reflecting prism carried by one of the limbs.

2. In an instrument for measuring vertical angles the combination, with a holder, of a pendulum suspended to this holder and composed of two limbs, which are rotatable relatively to each other about an axis at right angles to the plane, in which the pendulum is allowed to swing, a circular scale arranged on one of the limbs concentrically to the said axis of rotation, pointing means for this scale carried by the other limb and a direct vision reflecting prism carried by one of the limbs, the center of gravity of the latter limb lying in the axis of rotation.

3. In an instrument for measuring vertical angles the combination, with a holder, of a pendulum suspended to this holder and composed of two limbs, which are rotatable relatively to each other about an axis at right angles to the plane, in which the pendulum is allowed to swing, a circular scale arranged on one of the limbs concentrically to the said axis of rotation, pointing means for this scale carried by the other limb, a direct vision reflecting prism carried by one of the limbs and a subsidiary mirror carried by the other limb, the center of gravity of the limb which carries the direct vision prism lying in the axis of rotation.

FREDERICK J. B. CORDEIRO.
CARL PULFRICH.

Witnesses:
 PAUL KRÜGER,
 ALFRED MACKEDANZ.